R. A. WORKMAN.
POWER TRANSMISSION.
APPLICATION FILED SEPT. 26, 1919.

1,378,751.

Patented May 17, 1921.
3 SHEETS—SHEET 1.

INVENTOR.
Ross Alexander Workman

R. A. WORKMAN.
POWER TRANSMISSION.
APPLICATION FILED SEPT. 26, 1919.

1,378,751.

Patented May 17, 1921.

INVENTOR
Ross Alexander Workman
BY
ATTORNEY

UNITED STATES PATENT OFFICE.

ROSS ALEXANDER WORKMAN, OF SPRINGFIELD, MISSOURI.

POWER TRANSMISSION.

1,378,751.                Specification of Letters Patent.        Patented May 17, 1921.

Application filed September 26, 1919.   Serial No. 326,482.

*To all whom it may concern:*

Be it known that I, ROSS ALEXANDER WORKMAN, a citizen of the United States, residing at Springfield, Greene county, Missouri, have invented a new and useful Power Transmission, of which the following is a specification.

The present invention relates to power transmission mechanism for use especially on tractors, although useful generally for other suitable purposes, and the invention has for its object the provision of a novel and improved construction and assemblage for the component elements whereby variable speeds can be obtained without gear changes, by the use of a friction wheel operating between a pair of friction disks, and the mechanism also including a novel relation of gears driven from said friction disks for operating the driven member and for changing or reversing the rotation thereof.

The invention is illustrated in the accompanying drawings, wherein:—

Figure 1:
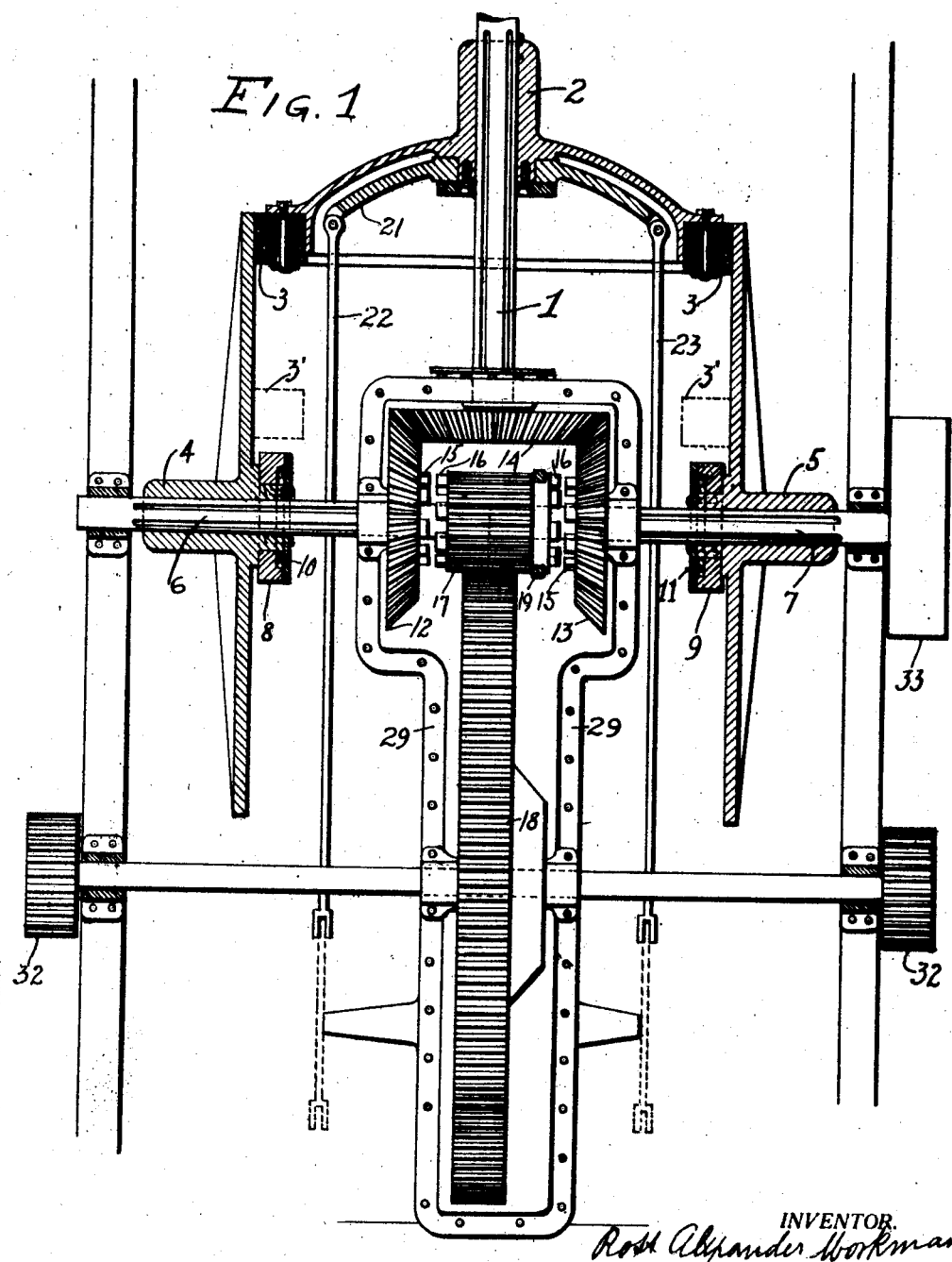
Figure 1 is a plan view of the mechanism, portions being removed and portions shown in section.
Figure 2:
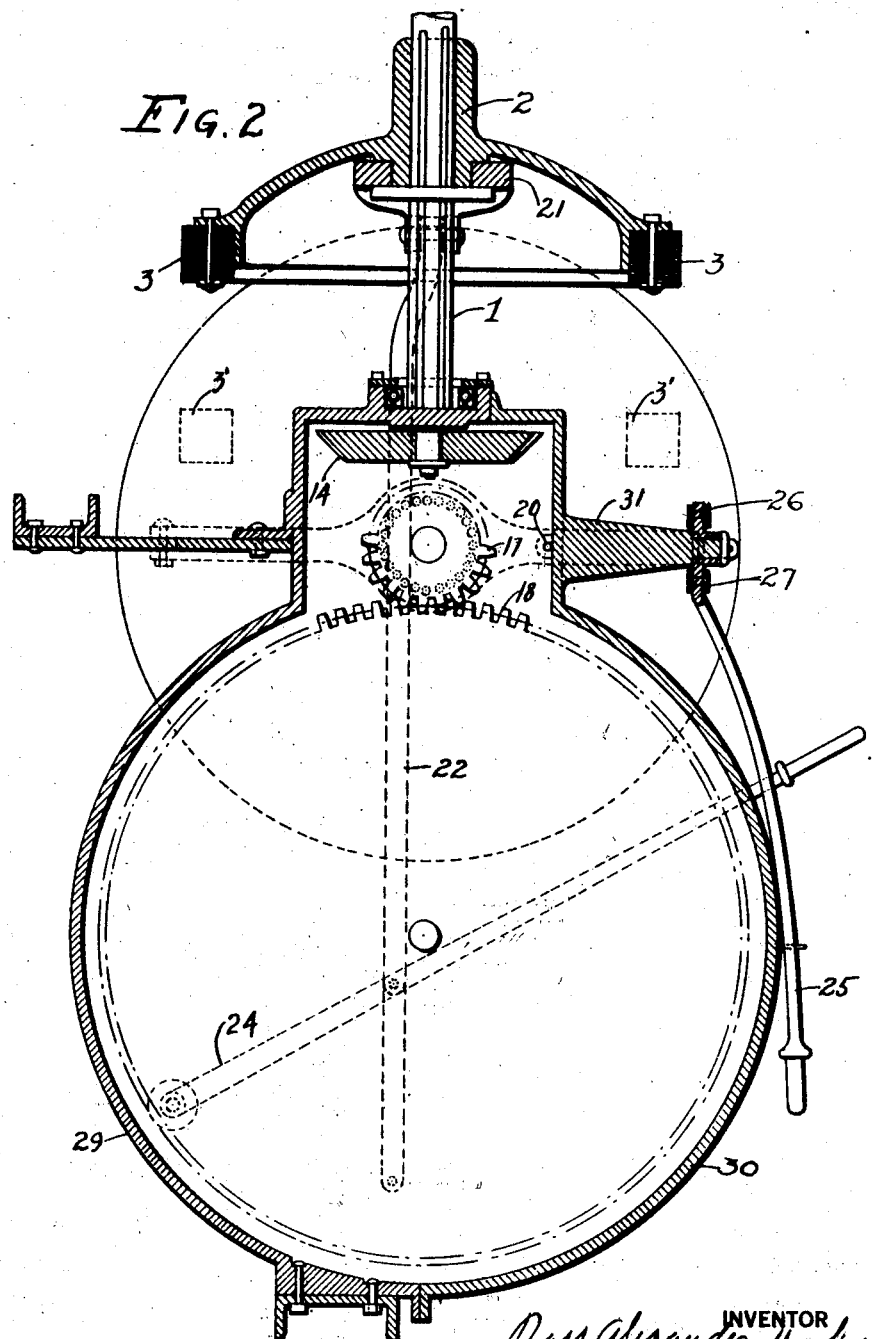
Fig. 2 is a median vertical longitudinal section of mechanism.
Figure 3:
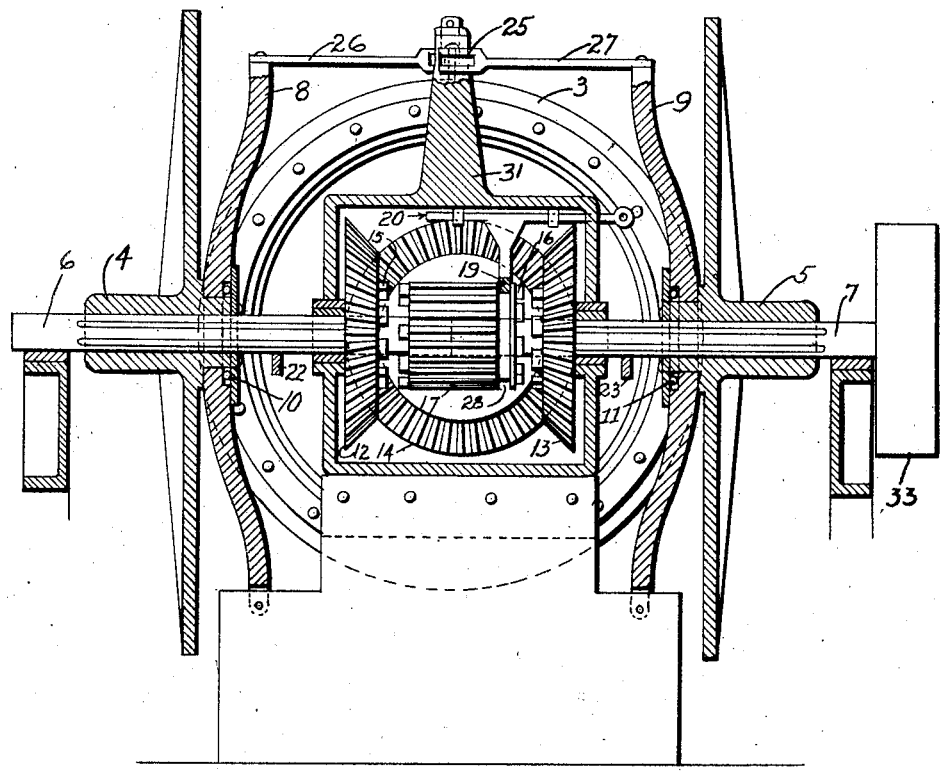
Fig. 3 is a cross section in a plane located centrally of the friction disks, portions being shown in elevation.
Figure 4:
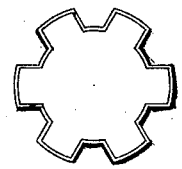
Fig. 4 is an end view of one of the splined shafts.
Figure 5:
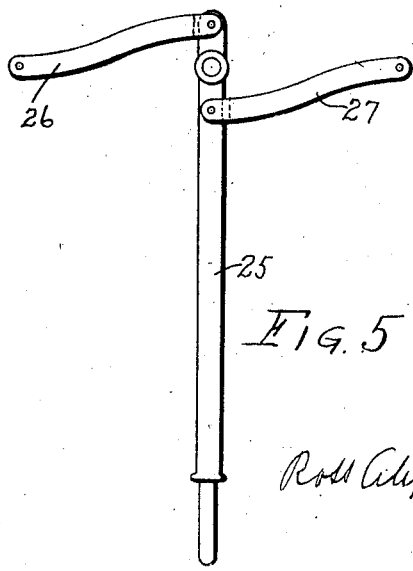
Fig. 5 is a plan view of the friction disk controlling lever.

The mechanism is driven from a longitudinal drive shaft 1, on which a dished friction wheel 2 is splined so as to be slidable longitudinally on said shaft and to rotate therewith. This wheel 2 has an annular rim member 3 of suitable friction material to contact with the confronting faces of a pair of friction disks 4 and 5 splined upon a pair of tranverse alining shafts 6 and 7 journaled in a suitable frame, and upwardly projecting levers 8 and 9 are fulcrumed at their lower ends to the frame, and the hubs of said friction disks 4 and 5 are swiveled, as at 10 and 11, respectively, in said levers, and the upper ends of said levers are connected by links 26 and 27 with a controlling lever 25 mounted on a post 31 rising from the cover 30 of the gear case 29. By swinging the lever 25, the levers 8 and 9 can be swung for moving the friction disks 4 and 5 toward one another into contact with the friction wheel 2 thereby clamping said wheel between the disks and maintaining a good frictional contact between the wheel and disks, and when the lever 25 is swung in the opposite direction, the disks are separated to release the friction wheel.

The friction wheel 2 is slid longitudinally by means of a yoke 21 swiveled to the hub of the wheel and located within the dished portion of the wheel, as seen in Fig. 1, and connected by links or rods 22 and 23 with a shifting lever 24 suitably fulcrumed to the frame, whereby said lever 24 in being swung by hand or otherwise will shift the wheel 2 longitudinally to different positions along the faces of the disks for changing the speed of the disks, as will be apparent. Various speeds or speed ratios are thus obtained, and the disks can be separated for the free movement of the friction wheel from the slow speed position shown in full lines in Fig. 1 to the high speed position indicated in dotted lines at 3' in Fig. 1, or conversely. As shown, the levers 24 and 25 are operated by hand.

The adjacent ends of the shafts 1, 6 and 7 enter the gear case 29 and are journaled therein, and bevel gears 12 and 13 are secured on the shafts 6 and 7, respectively, within said case and mesh with an idler bevel gear 14 rotatable loosely on the end of the shaft 1, whereby the gears 12 and 13 and disks 4 and 5 rotate simultaneously in opposite directions. A pinion 17 is mounted for rotation on the adjacent ends of the shafts 6 and 7 which abut within said pinion, and said pinion is rotatable freely on said shafts about the transverse axis thereof and is slidable transversely to alternately connect said pinion with the gears 12 and 13. Thus, the ends of the pinions 17 have clutch teeth or lugs 16 to engage clutch lugs 15 on the adjacent faces of the gears 12 and 13, whereby the pinion 17 is readily engaged with either of the bevel gears 12 and 13 to rotate therewith, and thereby enabling said pinion to be rotated in opposite directions. The pinion 17 is shifted by means of a shift rod 20 slidable transversely in the top or cover 30 of the gear case 29 and having a fork 19 fitting within an annular groove 28 in the pinion 17.

A gear wheel 18 within the gear case 29 at that side of the pinion 17 opposite to the shaft 1 meshes with the pinion and constitutes the driven member which, as shown, is mounted on a shaft having pinions 32 for transmitting the power, although the arrangement shown is arbitrary and the power can be transmitted from the gear wheel 18 in any desired manner to the wheels of the tractor, or the like.

A pulley wheel 33 is also shown as secured on the outer end of the shaft 7, for driving a belt when desired, as when using tractor as a power plant.

In operation, the disks 4 and 5 when moved against the friction wheel 2 will be rotated thereby, so as to rotate the gears 12 and 13 in opposite directions and the pinion 17 can be shifted to serve as a clutch. When the pinion 17 is in intermediate position, the gear wheel 18 is disconnected from the shaft 1 and the pinion 17 can be shifted in either direction to engage the corresponding bevel gear 12 or 13 and rotate the wheel 18 in the desired direction. By shifting the friction wheel 2, the speed is readily changed without gear changes as when using variable speed gears, and the arrangement is compact and advantageous.

Having thus described the invention, what is claimed as new is:—

1. Transmission gearing including a longitudinal drive shaft, a pair of alined transverse shafts, friction disks slidably mounted on said transverse shafts, a friction wheel slidably mounted on the longitudinal shaft between the friction disks to contact therewith, bevel gears secured on the transverse shafts and having clutch portions, an idler bevel gear mounted in mesh with said bevel gears, means for sliding said friction disks to engage and disengage said friction wheel, the adjacent ends of said transverse shafts being disposed in abutment between said first named bevel gears, a pinion slidably mounted on the adjacent ends of said transverse shafts and having clutch portions to alternately engage the aforesaid clutch portions, a gear wheel opposite to the longitudinal shaft meshing with said pinion, and operating means for shifting said pinion having a portion projecting in between the first named bevel gears and engaging the pinion.

2. Transmission gearing including a transmission case, a longitudinal drive shaft, a pair of alined transverse shafts having their adjacent ends extending and abutting within said case, friction disks slidably mounted on the transverse shafts, a frictional wheel slidable on the longitudinal shaft between the friction disks for contact therewith, bevel gear secured on the transverse shafts within the case and having clutch portions, an idler bevel gear mounted within the case meshing within said bevel gears, a pinion slidably mounted on the adjacent ends of said transverse shafts and having clutch portions to alternately engage the aforesaid clutch portions, and a gear wheel opposite to the longitudinal shaft meshing with said pinion.

ROSS ALEXANDER WORKMAN.